US009976054B2

United States Patent
Santhanam

(10) Patent No.: US 9,976,054 B2
(45) Date of Patent: May 22, 2018

(54) ADDITIVES FOR CURABLE LIQUID COMPOSITIONS

(75) Inventor: Raghu Santhanam, Emeryville, CA (US)

(73) Assignee: DURA CHEMICALS, INC., Emeryville, CA (US)

( * ) Notice: Subject to any disclaimer, the term of this patent is extended or adjusted under 35 U.S.C. 154(b) by 1115 days.

(21) Appl. No.: 13/331,998

(22) Filed: Dec. 20, 2011

(65) Prior Publication Data

US 2012/0165435 A1    Jun. 28, 2012

Related U.S. Application Data

(60) Provisional application No. 61/427,667, filed on Dec. 28, 2010, provisional application No. 61/448,118, filed on Mar. 1, 2011.

(51) Int. Cl.
| | | |
|---|---|---|
| *C08K 5/34* | (2006.01) | |
| *C09D 167/08* | (2006.01) | |
| *C09D 11/03* | (2014.01) | |
| *C09D 11/101* | (2014.01) | |
| *C08K 5/00* | (2006.01) | |

(52) U.S. Cl.
CPC .......... *C09D 167/08* (2013.01); *C08K 5/0091* (2013.01); *C09D 11/03* (2013.01); *C09D 11/101* (2013.01)

(58) Field of Classification Search
None
See application file for complete search history.

(56) References Cited

U.S. PATENT DOCUMENTS

| | | | |
|---|---|---|---|
| 2,966,453 | A | 12/1960 | Gleim et al. |
| 4,672,047 | A | 6/1987 | Chandler |
| 6,344,516 | B1 | 2/2002 | Ikeda et al. |
| 6,602,960 | B1 | 8/2003 | Harwood et al. |
| 7,129,373 | B2 | 10/2006 | Coleman et al. |
| 7,304,108 | B2 | 12/2007 | Nakagawa et al. |
| 2005/0008892 | A1 | 1/2005 | Yamamoto et al. |
| 2005/0245639 | A1 | 11/2005 | Oostveen et al. |
| 2009/0043018 | A1 | 2/2009 | Tanaka |
| 2009/0253833 | A1 | 10/2009 | Hage et al. |

FOREIGN PATENT DOCUMENTS

| | | | |
|---|---|---|---|
| EP | 2204166 A2 | | 7/2010 |
| JP | 02-263880 A | | 10/1990 |
| JP | 2005-154628 | * | 6/2005 |
| JP | 2005154628 A | | 6/2005 |
| WO | WO2003/093384 A1 | | 11/2003 |

OTHER PUBLICATIONS

Machine Translation of Masanori et al. JP 2005-154628 Jun. 16, 2005, p. 1-6.*
Encyclopedia Britannica definition of Alkyd Resin, p. 1.*
Mochida et al. "Remarkable catalytic activity of cobalt tetraphenylporphyrin modified on a titania for the oxidation of carbon monoxide below room temperature" J. Phys. Chem., 1985, 89 (25), pp. 5439-5442.
A.C. Zettlemoyer et al., Use of Amine Additives to Prevent Drying Loss on Aging, pp. 491-495, 1950.
M.E. Robinson, Haemoglobin and Methaemoglobin as Oxidative Catalysts, pp. 255-264, Biochem J..
Wu et al., Influence of drying catalyst on performances of waterborne alkyd resin coatings, Technical Research and Development (2008), 23(9): 24-27.
Impact of Siccative on Alkyd Resin Film Property, 1998, Shanghai Coating, pp. 52-55, Dec. 31, 1998.
Qu et al., Development on Alkyd Resin Coating Drying Mechanism Research, 2001,pp. 24-26, 30, Sep. 30, 2001.
Kaufmann et al., Die Molekül-Vergrößerung trocknender Öle unter dem Einfluß von Häminen, Fette, Seifen, Anstrichmittel (1956), 58(7):520-527.

* cited by examiner

*Primary Examiner* — Robert T Butcher
(74) *Attorney, Agent, or Firm* — Bozicevic, Field & Francis LLP; Bret E. Field

(57) ABSTRACT

Transition metal complex siccatives are provided. Aspects of the siccatives include a transition metal complexed with a cyclic tetradentate ligand. Aspects of the invention further include compositions that include the siccatives, as well as methods of making and using the same. Aspects of the invention further include use of the siccatives as a catalyst in various syntheses.

20 Claims, No Drawings

ADDITIVES FOR CURABLE LIQUID COMPOSITIONS

CROSS REFERENCE TO RELATED APPLICATIONS

This application claims priority under 35 U.S.C. § 119(e) (1) to U.S. Provisional Patent Application Ser. No. 61/427,667, filed Dec. 28, 2010, and to U.S. Provisional Patent Application Ser. No. 61/448,118, filed Mar. 1, 2011, the contents of which are incorporated herein by reference in their entireties.

INTRODUCTION

Air-drying liquid compositions are used in a variety of applications such as paints and resins. The process of air drying typically involves oxidation of the composition and formation of a crosslinked network. The oxidation reaction can be aided and accelerated by adding a drying/curing agent to the composition.

A variety of metal complexes have been used as drying/curing agents in liquid compositions. The metal complexes typically impart coloration to the composition, so optimization of the curing agent involves determining an appropriate balance between maximum activity (e.g., maximum acceleration of the drying/curing process) and minimum impact on the color of the finished coating or article.

Transition metal complexes contain a transition metal and one or more chelating ligands. Transition metals complexes that are commonly used as drying/curing agents include cobalt, manganese, and iron complexes with nitrogen-, oxygen-, phosphorous- or sulfur-containing ligands.

SUMMARY

Aspects of the invention include transition metal drying agents. Additional aspects include the use of such transition metal drying agents in air-drying compositions. Further aspects include the use of such air-drying compositions in applications such as coatings and molds.

In some aspects, there is described herein compositions comprising a resin and a siccative, wherein the siccative comprises a transition metal and a porphyrin ligand. In some embodiments, the resin is an alkyd-based resin, such as a resin comprising an unsaturated polyester prepared from a polyol, a polycarboxylic acid, and an unsaturated fatty acid. In some embodiments, the resin comprises a polyester or polyurethane and a crosslinkable media. Vinyl- or other alkene-containing monomers are an example of a suitable crosslinkable media.

In some aspects, there is described herein methods for forming a coating, the methods comprising applying to a substrate a composition comprising a resin and a siccative, wherein the siccative comprises a transition metal and a porphyrin ligand.

In some aspects, there is described herein methods for producing an air drying composition, the methods comprising combining a metal-porphyrin complex with a resin.

In some aspects, there is described herein methods for producing an air drying composition, the methods comprising combining: (a) a siccative; (b) a polyol; (c) a compound selected from the group consisting of polycarboxylic acids and polyisocyanates; and (d) a compound selected from the group consisting of unsaturated fatty acids and crosslinkable vinyl monomers.

In some aspects, there is described herein methods for producing an air drying composition, the methods comprising combining: (a) a siccative; and (b) a liquid curable component, wherein the liquid curable component is prepared by the reaction of: (a) a polyol; (b) a compound selected from the group consisting of polycarboxylic acids and polyisocyanates; and (c) a compound selected from the group consisting of unsaturated fatty acids and crosslinkable vinyl monomers.

In some aspects, there is described herein compositions comprising a resin precursor mixture and a metal-porphyrin complex.

In some aspects, there is described herein curable liquid compositions that contain a siccative and an alkyd-based resin or thermoset resin. The siccative is the component of the liquid composition that aids in the drying, curing, setting, or hardening process of the composition. The liquid may be any curable liquid, for example, coatings, inks and thermoset resin. In some embodiments, the siccatives of the invention are active cobalt, vanadium, iron and manganese compounds that are active as a siccative at relatively low concentrations.

In some aspects, there is described herein curable liquid media comprising: a) from 1 to 90 wt % of an alkyd-based resin, including any range within 1 to 90 wt %, e.g., from 20 to 80 wt %, from 30 to 70 wt %, etc.; and b) from 0.0001 to 1 wt % of a siccative, wherein the siccative is a cobalt, vanadium, iron or manganese complex of a tetradentate nitrogen donor ligand as described in detail below.

In some aspects, there is provided a composition for an air-drying coating, resin, ink, or floor covering, the composition comprising: (a) a crosslinkable resin; and (b) a siccative comprising a transition metal and a porphyrin-based ligand. In some embodiments the crosslinkable resin is an alkyd-based resin. In some embodiments the crosslinkable resin is a thermosetting resin. In some embodiments the crosslinkable resin comprises an alkyd-based emulsion, and the crosslinkable resin optionally further comprises a polymeric dispersion. In some embodiments the crosslinkable resin is prepared from a polyol, a polycarboxylic acid or a carboxylic anhydride, and a crosslinking agent (i.e., compound containing unsaturation). In some embodiments the polyol comprises 2, 3, 4, or 5 hydroxyl groups, and the carboxylic acid is a dicarboxylic acid. In some embodiments the compound containing unsaturation is selected from an unsaturated fatty acid (i.e., a drying fatty acid) and a vinyl monomer. In some embodiments, the composition further comprises one or more antioxidant in an amount from 0.001 to 0.5 wt %. In some embodiments, the composition further comprises one or more active metal carboxylate in an amount from 0.001 to 5 wt %.

In some aspects, there is provided a method for forming an air-drying composition comprising combining a siccative with a crosslinkable composition (e.g., a resin such as a thermoset resin or an alkyd resin as described above), wherein the siccative comprises a transition metal and a porphyrin ligand. In some embodiments the method further comprises applying the air-drying composition to a surface or to a mold and allowing the composition to cure. Accordingly, in some embodiments, there is provided a method for coating a surface, the method comprising applying to the surface a composition according to the disclosure herein.

In some aspects, there is provided a method for curing a composition on a surface, the method comprising: (a) contacting a composition comprising unsaturated carbon-carbon bonds to a siccative to form an air-curable composition; and (b) exposing the air-curable composition to air for a period of time sufficient to allow curing. In some embodiments, prior to the contacting in (a), the siccative is applied to the surface, and the contacting occurs by applying the composition comprising unsaturated carbon-carbon bonds over the siccative on the surface (or vice versa). Alternatively, in some embodiments, the contacting in (a) occurs by mixing the composition comprising unsaturated carbon-carbon bonds with the siccative, and the method further comprises applying the resulting air-curable composition to the surface.

These and other aspects will be apparent to the skilled artisan in light of the disclosure provided herein.

Definitions

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The term "typically" is used throughout the specification to indicate common practices of the invention. The term indicates that such disclosure is exemplary, although (unless otherwise indicated) not necessary, for the materials and methods of the invention. Thus, the term "typically" should be interpreted as "typically, although not necessarily." Similarly, the term "optionally," as in a material or component is optionally present, indicates that the invention includes instances wherein the material or component is present, and also includes instances wherein the material or component is not present.

The term "coatings" as used herein includes, without limitation, lacquers, stains, varnishes, paints, primers, and the like. Any such coating may be solvent-based or water-based.

The term "alkyl" as used herein refers to a branched, unbranched or cyclic saturated hydrocarbon group of 1 to about 50 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein may contain 1 to about 36, more typically 1 to 10, carbon atoms. The term "lower alkyl" intends an alkyl group of 1 to 6 carbon atoms, preferably 1 to 4 carbon atoms. The alkyl groups present on the polymers described herein may be unsubstituted or they may be substituted with one or more substituents including functional groups (e.g., amine, hydroxyl, an olefinic group such as a vinyl or an allyl group), or the like. "Substituted alkyl" refers to alkyl substituted with one or more substituent groups, and this includes instances wherein two hydrogen atoms from the same carbon atom in an alkyl substituent are replaced, such as in a carbonyl group (i.e., a substituted alkyl group may include a —C(=O)— moiety). Other substituents include halogen, ether, hydroxyl, amine functional groups, etc. as defined in more detail below. The terms "heteroatom-containing alkyl" and "heteroalkyl" refer to an alkyl substituent in which at least one carbon atom is replaced with a heteroatom, such as O, S, P, or N, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "alkylene" as used herein refers to a difunctional saturated branched or unbranched hydrocarbon chain containing from 1 to 50 carbon atoms. "Lower alkylene" refers to alkylene linkages containing from 1 to 12 carbon atoms, and includes, for example, methylene (—CH$_2$—), ethylene (—CH$_2$CH$_2$—), propylene (—CH$_2$CH$_2$CH$_2$—), 2-methyl-propylene (—CH$_2$—CH(CH$_3$)—CH$_2$—), hexylene (—(CH$_2$)$_6$—) and the like. Similarly, the terms "alkenylene," "alkynylene," "arylene," "alkarylene," and "aralkylene" refer to difunctional (i.e., linking) alkenyl, alkynyl, aryl, alkaryl, and aralkyl groups, respectively.

The term "alkenyl" as used herein refers to a linear, branched or cyclic hydrocarbon group of 2 to about 50 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein may contain 2 to about 36 carbon atoms, and for example may contain 2 to 12 carbon atoms. The term "lower alkenyl" intends an alkenyl group of 2 to 6 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively. Similarly, the term "olefin," as in an "olefinic compound" as used herein refers to a mono-unsaturated or di-unsaturated hydrocarbon of 2 to 36 carbon atoms, wherein in preferred embodiments a carbon-carbon double bond is positioned between the terminal 2 carbon atoms. Preferred olefinic groups within this class are sometimes herein designated as "lower olefinic groups," intending a hydrocarbon containing 2 to 18 carbon atoms containing a single terminal double bond. The latter moieties may also be termed "lower alkenyl." In some cases, it is a part of a silicon containing compound. Typically, but not necessarily, compounds containing olefinic groups are in a liquid form during use in the methods of the disclosure.

The term "alkynyl" as used herein refers to a linear or branched hydrocarbon group of 2 to 50 carbon atoms containing at least one triple bond, such as ethynyl, n-propynyl, and the like. Generally, although again not necessarily, alkynyl groups herein may contain 2 to about 18 carbon atoms, and such groups may further contain 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The terms "alkoxy" and "aryloxy" refer to an alkyl group and aryl group, respectively, bound through an oxygen linkage. In some embodiments, the alkyl or aryl group binds through the oxygen linkage to a non-carbon element, such as to a silicon atom. "Lower alkoxy" intends an alkoxy group containing 1 to 10, more preferably 1 to 7, carbon atoms. The terms "oxyalkylene" and "oxyarylene" refer to bifunctional (i.e., linking) alkoxy and aryloxy groups, respectively.

The term "aryl" as used herein refers to an aromatic species having 1 to 3 rings, but typically intends a monocyclic or bicyclic moiety, e.g., phenyl or 1- or 2-naphthyl groups. Optionally, these groups are substituted with 1 to 4, more preferably 1 to 2, substituents such as those described herein, including lower alkyl, lower alkoxy, hydroxyl, amino, and/or nitro. Aryl groups may, for example, contain 6 to 50 carbon atoms, and as a further example, aryl groups may contain 6 to 12 carbon atoms. For example, aryl groups may contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "aralkyl" refers to an alkyl group with an aryl substituent, and the term "alkaryl" refers to an aryl group with an alkyl substituent, wherein "alkyl" and "aryl" are as defined above. In general, aralkyl and alkaryl groups herein contain 6 to 50 carbon atoms. Aralkyl and alkaryl groups may, for example, contain 6 to 20 carbon atoms, and as a further example, such groups may contain 6 to 12 carbon atoms.

The term "amino" intends an amino group —$NR_2$ where R is hydrogen or an alternative substituent, typically lower alkyl. The term "amino" is thus intended to include primary amino (i.e., $NH_2$), "alkylamino" (i.e., a secondary amino group containing a single alkyl substituent), and "dialkylamino" (i.e., tertiary amino group containing two alkyl substituents).

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, furyl, pyrimidinyl, imidazolyl, 1,2,4-triazolyl, tetrazolyl, etc., and examples of heteroatom-containing alicyclic groups are pyrrolidino, morpholino, piperazino, piperidino, tetrahydrofuranyl, etc.

"Hydrocarbyl" refers to univalent hydrocarbyl radicals containing 1 to about 50 carbon atoms, including 1 to about 36 carbon atoms, further including 1 to about 18 carbon atoms, and further including about 1 to 12 carbon atoms, including linear, branched, cyclic, saturated and unsaturated species, such as alkyl groups, alkenyl groups, aryl groups, and the like. "Substituted hydrocarbyl" refers to hydrocarbyl substituted with one or more substituent groups, and the term "heteroatom-containing hydrocarbyl" refers to hydrocarbyl in which at least one carbon atom is replaced with a heteroatom such as O, N, P, Si, or S. Unless otherwise indicated, the term "hydrocarbyl" is to be interpreted as including substituted and/or heteroatom-containing hydrocarbyl moieties.

The term "ether" includes both mono and polyethers and refers to groups having a chain containing carbon and oxygen and each of these units consists of 2 to 6 carbons for each oxygen atom. Examples are diethyl and dipropyl ethers, polyethyleneoxide, polyprolyleneoxide, polyethelene glycol, polybuteleneoxide.

"Halo" or "halogen" refers to fluoro, chloro, bromo or iodo, and usually relates to halo substitution for a hydrogen atom in an organic compound.

As used herein, the term "perfluoro," such as a perfluoro group, perfluoro monomer, perfluoro oligomer or perfluoro polymer, refers to a moiety or compound in which fluoro atoms substitute for hydrogen atom completely or almost completely. In some embodiments of perfluoro groups, the hydrogen atoms on between 1 and 3 carbons at a terminus or at a terminal bonding site (i.e., where the group attaches to a substrate or to another chemical moiety) are not replaced with fluoro atoms. Perfluoro groups further include polycarbon or polyether chains having the hydrogen atoms replaced with fluoro atoms.

The terms "halocarbyl" and "halocarbon" refer to hydrocarbyl groups (as defined above) for which one or more hydrogen radicals are replaced with halo radicals. Similarly, the term "perhalocarbyl" refers to hydrocarbyl groups for which all hydrogen radicals are replaced with halo radicals. The terms "halocarbyl" and "halocarbon" include perhalocarbyl, and further includes fluorocarbyl groups, perfluorinated hydrocarbyl groups, chlorocarbyl groups, perchlorinated hydrocarbyl groups, bromocarbyl groups, perbrominated hydrocarbyl groups, iodocarbyl groups, and periodinated hydrocarbyl groups. Similarly, the term "haloether" refers to an ether group in which one or more hydrogen radicals are replaced with halo radicals, and the term "perhaloether" refers to an ether in which all hydrogen radicals are replaced with halo radicals. The term "haloether" includes perhaloethers, unless otherwise specified.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation, functional groups and the hydrocarbyl moieties $C_1$-$C_{24}$ alkyl (including $C_1$-$C_{18}$ alkyl, further including $C_1$-$C_{12}$ alkyl, and further including $C_1$-$C_6$ alkyl), $C_2$-$C_{24}$ alkenyl (including $C_2$-$C_{18}$ alkenyl, further including $C_2$-$C_{12}$ alkenyl, and further including $C_2$-$C_6$ alkenyl), $C_2$-$C_{24}$ alkynyl (including $C_2$-$C_{18}$ alkynyl, further including $C_2$-$C_{12}$ alkynyl, and further including $C_2$-$C_6$ alkynyl), $C_5$-$C_{30}$ aryl (including $C_5$-$C_{20}$ aryl, and further including $C_5$-$C_{12}$ aryl), and $C_6$-$C_{30}$ aralkyl (including $C_6$-$C_{20}$ aralkyl, and further including $C_6$-$C_{12}$ aralkyl). By a "functional group" is meant a group that contains one or more reactive moieties. Examples of functional groups include halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{20}$ aryloxy, acyl (including $C_2$-$C_{24}$ alkylcarbonyl (—CO-alkyl) and $C_6$-$C_{20}$ arylcarbonyl (—CO-aryl)), acyloxy (—O-acyl), $C_2$-$C_{24}$ alkoxycarbonyl (—(CO)—O-alkyl), $C_6$-$C_{20}$ aryloxycarbonyl (—(CO)—O-aryl), halocarbonyl (—CO)—X where X is halo), $C_2$-$C_{24}$ alkylcarbonato (—O—(CO)—O- alkyl), $C_6$-$C_{20}$ arylcarbonato (—O—(CO)—O-aryl), carboxy (—COOH), carboxylato (—COO—), carbamoyl (—(CO)—$NH_2$), mono-substituted $C_1$-$C_{24}$ alkylcarbamoyl (—(CO)—NH($C_1$-$C_{24}$ alkyl)), di-substituted alkylcarbamoyl (—(CO)—N($C_1$-$C_{24}$ alkyl)$_2$), mono-substituted arylcarbamoyl (—(CO)—NH-aryl), thiocarbamoyl (—(CS)—$NH_2$), carbamido (—NH—(CO)—$NH_2$), cyano (—C≡N), isocyano (—N+≡C—), cyanato (—O—C≡N), isocyanato (—O—N≡C—), isothiocyanato (—S—C≡N), azido (—N═N+═N—), formyl (—(CO)—H), thioformyl (—(CS)—H), amino (—$NH_2$), mono- and di-($C_1$-$C_{24}$ alkyl)-substituted amino, mono- and di-($C_5$-$C_{20}$ aryl)-substituted amino, $C_2$-$C_{24}$ alkylamido (—NH—(CO)-alkyl), $C_5$-$C_{20}$ arylamido (—NH—(CO)-aryl), imino (—CR═NH where R═hydrogen, $C_1$-$C_{24}$ alkyl, $C_5$-$C_{20}$ aryl, $C_6$-$C_{20}$ alkaryl, $C_6$-$C_{20}$ aralkyl, etc.), alkylimino (—CR═N(alkyl), where R═hydrogen, alkyl, aryl, alkaryl, etc.), arylimino (—CR═N (aryl), where R═hydrogen, alkyl, aryl, alkaryl, etc.), nitro (—$NO_2$), nitroso (—NO), sulfo (—$SO_2$—OH), sulfonato (—$SO_2$—O—), $C_1$-$C_{24}$ alkylsulfanyl (—S-alkyl; also termed "alkylthio"), arylsulfanyl (—S-aryl; also termed "arylthio"), $C_1$-$C_{24}$ alkylsulfinyl (—(SO)-alkyl), $C_5$-$C_{20}$ arylsulfinyl (—(SO)-aryl), $C_1$-$C_{24}$ alkylsulfonyl (—$SO_2$-alkyl), $C_5$-$C_{20}$ arylsulfonyl (—$SO_2$-aryl), phosphono (—P(O)(OH)$_2$), phosphonato (—P(O)(O—)$_2$), phosphinato (—P(O)(O—)), phospho (—$PO_2$), and phosphino (—$PH_2$), mono- and di-($C_1$-$C_{24}$ alkyl)-substituted phosphino, and mono- and di-($C_5$-$C_{20}$ aryl)-substituted phosphino. In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. For example, the phrase "substituted alkyl and aryl" is to be interpreted as "substituted alkyl and substituted aryl."

It will be appreciated by those of skill in the art that many of the preceding definitions overlap in scope and are not meant to be mutually exclusive. Accordingly, any particular chemical group may fall within more than one of the above-provided definitions.

Unless otherwise specified, reference to an atom is meant to include isotopes of that atom. For example, reference to H is meant to include 1H, 2H (i.e., D) and 3H (i.e., T), and reference to C is meant to include $^{12}C$ and all isotopes of carbon (such as $^{13}C$).

DETAILED DESCRIPTION

Before the present invention is described in greater detail, it is to be understood that the invention is not limited to particular embodiments described herein, as such may vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In certain aspects, this description provides materials for preparing air-curing (i.e., air-hardening or air-drying) liquid compositions. Such compositions include a siccative and a liquid curable component, such as a resin. Additional components of the liquid air-curing compositions may also be present, as described below. Throughout this disclosure, the liquid curable component may be alternatively and equivalently referred to as a "binder" or simply as a "resin."

The curable liquid compositions described herein include a liquid curable component. In some embodiments, the liquid curable component is a curable resin. Such resins are compounds or compositions that are capable of forming crosslinked materials via a curing reaction. In some embodiments curing of the resins is an oxidative process such that the curing occurs in air. For example, in some embodiments the curing reaction involves crosslinking of carbon-carbon double or triple bonds present in the resins. Various types of resins are suitable for the curable liquid compositions described herein, some of which are described below.

In some embodiments, alkyd-based resins (also referred to herein as "alkyd binders") are suitable as curable liquid components for the curable liquid compositions described herein. Alkyd-based resins are polyesters modified with fatty acids. In some embodiments, the fatty acids are unsaturated fatty acids (i.e., contain carbon-carbon double bond(s)).

In some embodiments, the alky-based resins contain polyesters prepared from a polyol, a polycarboxylic acid, and a fatty acid. Suitable polyols include diols, triols, and higher polyols, and examples are provided below. Suitable polycarboxylic acids include anhydrides, dicarboxylic acids, tricarboxylic acids, and higher polycarboxylic acids, and examples are also provided below. Suitable fatty acids include monoglycerides, diglycerides, triglycerides and higher glycerides, and examples are also provided below. Combinations of two or more polyols, and/or two or more polycarboxylic acids, and/or two or more unsaturated fatty acids may also be used in preparation of suitable alkyd-based resins.

Examples of suitable polyhydric alcohols include: glycerol, propylene glycol, neopentyl glycol, diethylene glycol, pentaerythritol, dipentaerythritol, ethylene glycol, trimethylolpropane, trimethylol ethane, di-trimethylol propane and 1,6-hexane diol. Combinations of such polyols may also be used. In some embodiments, the polyol is glycerol.

Polycarboxylic acids suitable for preparing alkyd resins include aromatic, aliphatic and cycloaliphatic polycarboxylic acids, as well as the corresponding anhydrides. Typical examples of such polyacids include: maleic acid, fumaric acid, adipic acid, azelaic acid, phthalic acid and its regio-isomeric analogues, trimellitic acid, pyromellitic acid, pimelic acid, sebacic acid, benzoic acid, para-tertiarybutyl-benzoic acid and tetra-hydrophthalic acid. Combinations of such polyacids may also be used.

Suitable drying fatty acids (which include semi-drying fatty acids) include ethylenically unsaturated conjugated or non-conjugated $C_2$-$C_{24}$ carboxylic acids, such as linoleic, linolenic, oleic, ricinoleic, licanic acid and eleostearic acids or mixture thereof. In some embodiments, the drying fatty acid is in the form of mixtures of fatty acids derived from natural or synthetic oils.

Alternatively, in some embodiments, the resins suitable as liquid curable components are thermosetting resins containing unsaturated polyesters. Such unsaturated polyesters may be prepared using saturated or unsaturated fatty acids, although in some embodiments saturated fatty acids are used, and in some embodiments no fatty acids are used at all. In some embodiments, the unsaturated polyester resin is prepared from a polycarboxylic acid and a polyol, wherein unsaturation (i.e., carbon-carbon double or triple bonds) is present in either or both components. In some embodiments, the thermosetting resin is a polyester (prepared from the condensation reaction of polycarboxylic acids and polyols) dissolved in suitable crosslinkable organic media. Polycarboxylic acids and polyhydric alcohols include those listed above. Crosslinkable organic media include, but are not limited to, vinyl monomers such as styrene (vinylbenzene) and acrylates (e.g., methacrylate and methylmethacrylate), as well as analogues and derivatives thereof.

In addition to the synthetic resins mentioned above, natural resins such as plant resins and shellacs may also be used as the liquid curable components of the compositions described herein. For example, pine resins and other terpene-based plant resins are suitable.

In some embodiments, the curable liquid compositions contain a siccative. By siccative is meant a substance that enables and/or accelerates the drying process of an air-drying medium. The siccatives of interest are transition metal complexes containing tetradentate nitrogen donor ligands.

In some embodiments, the transition metal of the siccatives of interest is selected from Co, Fe, V, and Mn, or combinations thereof. For example, the cobalt ion is selected from Co(II) and Co(III), the vanadium ion is selected from V(II) and V(III), the iron ion is selected from Fe(II) and Fe(III) and the manganese ion is selected from Mn(II), Mn(III), and Mn (IV).

In some embodiments, the ligands of the siccatives of interest are selected from porphyrin ligands. A porphyrin is a compound containing four nitrogen heterocycles arranged in a cyclic structure. For example, in some embodiments, the porphyrin ligands of interest have the structure of Formula (I)

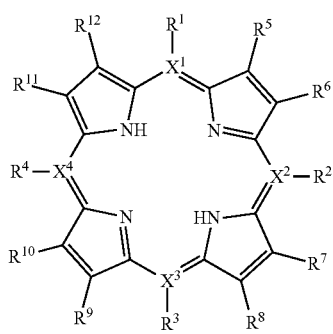

wherein:
$X^1$, $X^2$, $X^3$, and $X^4$ are independently selected from C and N;
$R^1$-$R^{12}$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, provided that when $X^1$, $X^2$, $X^3$, or $X^4$ is N, then the corresponding R group ($R^1$, $R^2$, $R^3$, or $R^4$, respectively) is not present. Any such groups may be unsubstituted or substituted and may contain one or more heteroatoms as appropriate (i.e., as the chemical nature of the group allows for such substitution or heteroatoms). Furthermore, any two adjacent groups selected from $R^1$-$R^{12}$ may be taken together to form a cycle, wherein such cycle may be aliphatic, aromatic, heteroatom-containing, and/or substituted as appropriate.

For example, in some embodiments, $X^1$, $X^2$, $X^3$, and $X^4$ are N, and $R^1$, $R^2$, $R^3$, and $R^4$ are not present. In some embodiments, $X^1$, $X^2$, $X^3$, and $X^4$ are C, and $R^1$, $R^2$, $R^3$, and $R^4$ are present. In some embodiments, one or more of $X^1$, $X^2$, $X^3$, and $X^4$ are C, and one or more of $X^1$, $X^2$, $X^3$, and $X^4$ are N.

For example, $R^1$-$R^{12}$ are independently selected from:
hydrogen;
halo, including F, Cl, Br, and I;
substituted or unsubstituted $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, and $C_6$-$C_{24}$ aralkyl;
substituted or unsubstituted heteroatom-containing $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, and $C_6$-$C_{24}$ aralkyl;
hydroxyl;
substituted or unsubstituted $C_1$-$C_{24}$ alkoxy, $C_2$-$C_{24}$ alkenyloxy, $C_2$-$C_{24}$ alkynyloxy, $C_5$-$C_{20}$ aryloxy, and acyloxy;
acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, and thioformyl;
$C_2$-$C_{24}$ alkylcarbonato and $C_6$-$C_{20}$ arylcarbonato;
carboxy and carboxylato (including $C_2$-$C_{24}$ alkylcarboxylato and $C_6$-$C_{20}$ arylcarboxylato);
carbamoyl (including mono-($C_1$-$C_{24}$ alkyl)-substituted carbamoyl, di-($C_1$-$C_{24}$ alkyl)-substituted carbamoyl, monosubstituted arylcarbamoyl, and mixed alkyl/aryl substituted carbamoyl) and thiocarbamoyl;
carbamato (including mono-($C_1$-$C_{24}$ alkyl)-substituted carbamato, di-($C_1$-$C_{24}$ alkyl)-substituted carbamato, monosubstituted arylcarbamato, and mixed alkyl/aryl substituted carbamato);
carbamido,
cyano, isocyano, cyanato, isocyanato, and isothiocyanato;
amino (including mono- and di-($C_1$-$C_{24}$ alkyl)-substituted amino, mono- and di-($C_5$-$C_{20}$ aryl)-substituted amino, and mixed alkyl/aryl substituted amino);
alkylamido and $C_6$-$C_{20}$ arylamido;
imino, alkylimino, and arylimino;
nitro;
nitroso;
sulfhydryl (including $C_1$-$C_{24}$ alkylsulfanyl, and $C_5$-$C_{20}$ arylsulfanyl);
sulfo (including $C_1$-$C_{24}$ alkylsulfonato, and $C_5$-$C_{20}$ arylsulfonato);
sulfino (including $C_1$-$C_{24}$ alkylsulfinyl, and $C_5$-$C_{20}$ arylsulfinyl);
sulfonyl (including $C_1$-$C_{24}$ alkylsulfonyl, and $C_5$-$C_{20}$ arylsulfonyl);
phosphino (including mono-, di-, and tri-($C_1$-$C_{24}$ alkyl)-substituted phosphinato, mono-, di-, and tri-($C_5$-$C_{20}$ aryl)- substituted phosphinato, mixed akly/aryl substituted phosphinato, and phosphine oxides); and phosphono (including mono- and di-($C_1$-$C_{24}$ alkyl)-substituted phosphonato, mono- and di-($C_5$-$C_{20}$ aryl)-substituted phosphonato, mixed alkyl/aryl substituted phosphonato, and O-phosphonato).

$R^1$-$R^{12}$ may be selected from enols, ketones, esters, aldehydes, anhydrides, and acyl halides, ethers, epoxies, phosphonics, phosphates, phospinites, phosphate esters, imides, azides, azoes, nitrates, nitriles, carbimides, aziridines, hydrozylamines, ketoximes, aldoximes, nitrate esters, enamines, azoles, imidazols, pyrroles, indoles, purines, pyrimidines, piperidines, pyridazines, pyridyl and derivatives, linear, cyclic and aromatic, oxyhalides, sulfides, thioethers, thioesters, sulfonates, sulfinyls, thiocyanates, disulfides, sulfones, thioamides, sulfoxides, isothyocyanates, sulfonamides, sulfonyl halides, thioureates, and thiophosphate esters.

In some embodiments, $R^1$, $R^2$, $R^3$, and $R^4$ are the same. For example, in some embodiments, $R^1$, $R^2$, $R^3$, and $R^4$ are the same and are selected from hydrogen, substituted or unsubstituted $C_1$-$C_{24}$ alkyl, substituted or unsubstituted heteroatom-containing $C_1$-$C_{24}$ alkyl, substituted or unsubstituted $C_5$-$C_{20}$ aryl, and substituted or unsubstituted $C_5$-$C_{20}$ heteroaryl. For example, $R^1$, $R^2$, $R^3$, and $R^4$ are the same and are selected from hydrogen, phenyl, and methoxyphenyl.

In some embodiments, $R^5$, $R^6$, $R^7$, $R^8$, $R^9$, $R^{10}$, $R^{11}$, and $R^{12}$ are the same. For example, in some embodiments, $R^5$, $R^6$, $R^7$, $R^8$, $R^9$, $R^{10}$, $R^{11}$, and $R^{12}$ are the same and are hydrogen.

In some embodiments, $R^1$, $R^2$, $R^3$, and $R^4$ are the same and are a first group, $R^5$, $R^6$, $R^7$, $R^8$, $R^9$, $R^{10}$, $R^{11}$, and $R^{12}$ are the same and are a second group, and the first and second groups are different groups.

In some embodiments, $X^1$, $X^2$, $X^3$, and $X^4$ are the same. In other embodiments, $X^1$, $X^2$, $X^3$, and $X^4$ are not the same.

In some embodiments, the ligands of the siccatives of interest have the structure of Formula (II):

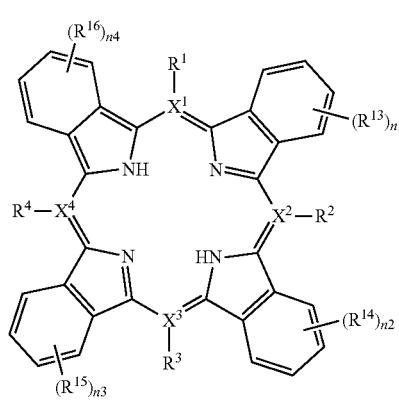

wherein:
$X^1$, $X^2$, $X^3$, $X^4$, $R^1$, $R^2$, $R^3$, and $R^4$ are as defined in formula (I) above;
n1, n2, n3, and n4 are independently selected from the integers 0, 1, 2, 3, and 4; and
each $R^{13}$, $R^{14}$, $R^{15}$, and $R^{16}$ is independently selected from the groups defined above for $R^1$-$R^{12}$ in formula (I).

For example, in some embodiments, n1, n2, n3, and n4 are each 0.

In some embodiments, pairs of substituents selected from $R^{13}$, $R^{14}$, $R^{15}$, and $R^{16}$ may be taken together to form further cycles, wherein such cycles are aliphatic, aromatic, heteroatom-containing, and/or substituted.

For example, in some embodiments, the ligand of the siccative is phthalocyanine, tetrabenzoporphyrin, tetraazaporphyrin, or porphyrin.

Accordingly, in some embodiments the siccatives of interest have the structure of Formula (Ia) or (IIa)

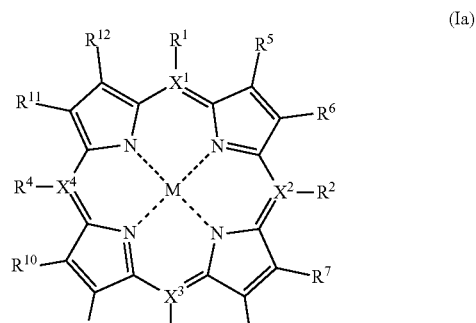

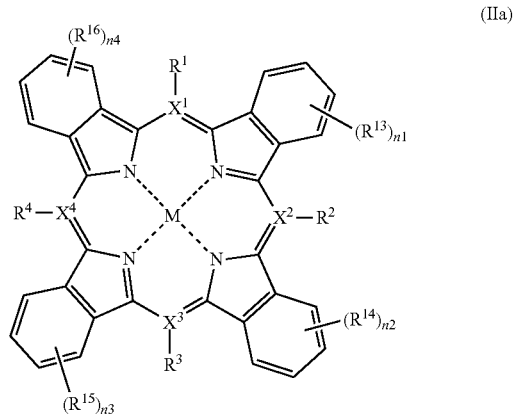

wherein:
M is selected from Co, V, Fe, and Mn; and
n1-n4, $X^1$-$X^4$, and $R^1$-$R^{16}$ are as described above in Formula (I) and Formula (II). It will be appreciated that the dashed lines and double bonds shown in the formulae herein are drawn in certain orientations but are not intended to imply a definite or fixed location of such bonds. In other words, resonance structures of the formulae drawn herein are intended to be within the scope of the invention.

Ligands of interest include tetraarylporphyrins, diarylporphyrins, tetraalkylporphyrins, dialkylporphyrins, and mixed aryl/alkyl porphyrins, as well as porphyrins containing alkenyl substituents, alkynyl substituents, heteroatom-containing substituents (e.g., heteroaryl, etc.), functionalized substituents (e.g., alkyl substituted with a carboxyl group, etc.), and the like. Specific ligands of interest include, but are not limited to: phthalocyanine; tetrabenzoporphyrin; tetraazaporphyrin; tetratolylporphyrin; porphyrin; porphyrazine; 5,10,15,20-tetrakisphenylporphyrin; 5,10,15,20-tetrakis(4'-methoxyphenyl)porphyrin; 5-azaprotoporphyrin dimethylester; bis-porphyrin; coproporphyrin III; coproporphyrin III tetramethylester; deuteroporphyrin; deuteroporphyrin IX dimethylester; diformyldeuteroporphyrin IX dimethyl ester; dodecaphenylporphyrin; hematoporphyrin; hematoporphyrin IX; hematoporphyrin monomer; hematoporphyrin dimer; hematoporphyrin derivative; hematoporphyrin IX dimethylester; haematoporphyrin IX dimethylester; mesoporphyrin dimethylester; mesoporphyrin IX dimethylester; monoformyl-monovinyl-deuteroporphyrin IX dimethylester; monohydroxyethylvinyl deuteroporphyrin; 5,10,15,20-tetra(o-hydroxyphenyl)porphyrin; 5,10,15,20-tetra(m-hydroxyphenyl)porphyrin; 5,10,15,20-tetrakis-(m-hydroxyphenyl)porphyrin; 5,10,15,20-tetra(p-hydroxyphenyl)porphyrin; 5,10,15,20-tetrakis-(3-methoxyphenyl)porphyrin; 5,10,15,20-tetrakis-(3,4-dimethoxyphenyl)porphyrin; 5,10,15,20-tetrakis(3,5-dimethoxyphenyl)porphyrin; 5,10,15,20-tetrakis-(3,4,5-trimethoxyphenyl)porphyrin; 2,3,7,8,12,13,17,18-octaethyl-5,10,15,20-tetraphenylporphyrin; Photofrin; porphyrin c; protoporphyrin; protoporphyrin IX; protoporphyrin dimethylester; protoporphyrin IX dimethylester; protoporphyrin propylaminoethylformamide iodide; protoporphyrin N,N-dimethylaminopropylformamide; protoporphyrin propylaminopropylformamide iodide; protoporphyrin butylforinamide; protoporphyrin N˜-dimethylamino-formamide; protoporphyrin formamide; sapphyrin 13,12,13,22-tetraethyl-2,7,18,23 tetramethyl sapphyrin-8,17-dipropanol; sapphyrin 2 3,12,13,22-tetraethyl-2,7,18,23 tetramethyl sapphyrin-8-monoglycoside; sapphyrin 3; meso-tetra-(4-N-carboxyphenyl)-porphine; tetra-(3-methoxyphenyl)-porphine; tetra-(3-methoxy-2,4-difluorophenyl)-porphine; 5,10,15,20-tetrakis(4-N-methylpyridyl)porphine; meso-tetra-(4-N-methylpyridyl)porphine tetrachloride; meso-tetra (4-N-methylpyridyl)porphine; meso-tetra-(3-N-methylpyridyl)-porphine; meso-tetra-(2-N-methylpyridyl) porphine; tetra(4-NNN-trimethylanifinium)porphine; meso-tetra-(4-NNN"-trimethylamino-phenyl)porphine tetrachloride; tetranaphthaloporphyrin; 5,10,15,20-tetraphenylporphyrin; tetraphenylporphyrin; meso-tetra-(4-N-sulfonatophenyl)-porphine; tetraphenylporphine tetrasulfonate; meso-tetra-(4-sulfonatophenyl)porphine; tetra-(4-sulfonatophenyl)porphine; tetraphenylporphyrin sulfonate; meso-tetra-(4-sulfonatophenyl)porphine; tetrakis-(4-sulfonatophenyl)porphyrin; meso-tetra(4-sulfonatophenyl)porphine; meso-(4-sulfonatophenyl)porphine; meso-tetra-(4-sulfonatophenyl)porphine; tetrakis(4-sulfonatophenyl)porphyrin; meso-tetra-(4-N-trimethylanilinium)-porphine; uroporphyrin; uroporphyrin I; uroporphyrin IX; and uroporphyrin III. In some embodiments, naturally derived porphyrins are suitable, such as the porphyrin ligands found in heme or chlorophyll. Additional specific ligands and methods for their preparation can be found in the relevant literature, such as Kadish et al., *Handbook of Porphyrin Science: With Applications to Chemistry, Physics, and Materials* (World Scientific, 2010), the contents of which are incorporated by reference.

In some embodiments, compositions (i.e., liquid curable media) of interest contain a siccative, a liquid curable component such as a resin, and optional additional components as described below.

In some embodiments, the siccative is present in the liquid curable medium from 0.00001 to 1% w/w, or from 0.0001 to 1% w/w, or from 0.001 to 0.8% w/w, or from 0.002 to 0.7% w/w. In some embodiments, the siccative is present in an amount of about 0.0001 wt % or greater, or about 0.001 wt % or greater, or about 0.001 wt % or greater, or about 0.01 wt % or greater, or about 0.1 wt % or greater, or about 1 wt % or greater. In some embodiments, the siccative is present in an amount of about 1 wt % or less, or about 0.01 wt % or less, or about 0.001 wt % or less, or about 0.0001 wt % or less. Any of the siccatives described herein, as well as combinations of such, may be used.

In some embodiments, the liquid curable component is present in an amount from 1 to 90 wt % or greater, or from 2 to 80 wt %, or from 3 to 70 wt %. In some embodiments, the liquid curable component is present in an amount of about 1 wt % or greater, or about 2 wt % or greater, or about 5 wt % or greater, or about 10 wt % or greater, or about 25 wt % or greater, or about 50 wt % or greater, or about 75 wt % or greater. In some embodiments, the liquid curable component is present in an amount of about 90 wt % or less, or about 80 wt % or less, or about 75 wt % or less, or about 50 wt % or less. Any of the resins described herein, as well as combinations of such, may be used as the liquid curable component.

In some embodiments, the liquid curable component contains carbon-carbon double- or triple-bonds and is present in an amount such that the composition contains about 2 mol % or more (e.g. 3 mol %, or 4 mol %, or 5 mol %, or 5 mol % or greater) of an unsaturated compound.

In some embodiments, the compositions include an alkyd-based binder (i.e., alkyd resin) as well as an additional binder compound or composition. For example, a polyacrylate and/or a polyurethane binder are suitable as additional binders. Thus, in some embodiments, the compositions of interest contain: 1) an alkyd-based binder; and 2) a polyacrylate and/or a polyurethane binder.

In some embodiments, the siccatives disclosed herein are useful in preparing compositions suitable for coating applications such as inks, paints, varnish or wood stain, linoleum floor coverings, and other coatings, as well as bulk (i.e., non-coating) applications using the resins described herein. As described above, such compositions include alkyd-based resins as well as non-alkyd based resins. In some embodiments, the siccatives disclosed herein may be used in materials (e.g., paints/inks/print/etc.) which contain non-alkyd-based resins that contain 2% or more of carbon-carbon double- or triple-bonds (i.e., unsaturated compounds). In some embodiments, the siccatives disclosed herein may be used in peroxide induced curing of thermoset resins. In some embodiments, the paints, inks, etc. contain unsaturated oils/acids as cross-linking agent, as described herein.

As mentioned, in some embodiments, the compositions (i.e., liquid curable media) described herein are useful as inks, resins, coatings, thermoset resins, linoleum floor coverings, paints, etc. In such embodiments, the compositions of interest may further contain other materials, including additional materials that are present so that the finished article (i.e., the dried composition) fulfills desired properties. These materials include, but are not limited to colorants, pigment, anti-corrosives, and/or extender pigment and/or a dye. Furthermore, additional components include surfactants, emulsifiers, anti-oxidants, other (non-transition metal or non-porphyrin based) siccatives, plasticizers, surface-controlling agents, anti-silking agents, defoaming agents, rheological controlling agents, active metal carbonates, nitrogen-containing ligands, binders, fillers, anti-reflective agents, diluents, and toughening agents and/or an ultraviolet absorbers. The use of such materials will depend, of course, on the intended application. Additional details regarding such materials are provided below, but are intended to be merely representative and not exhaustive.

In some embodiments, the compositions can be used as an ink, wherein the term "ink" refers to a liquid that provides color to a surface when applied to the surface. In some embodiments, an ink is absorbed into the material to which it is applied, and therefore does not form a coating layer (as is typical for paints). In some embodiments, a suitable ink contains a siccative and an alkyd resin varnish modified with unsaturated fatty acids as defined above. Such liquid curable media can act as a vehicle component of the ink. Such inks include, but are not limited to, a metal plate ink, lithographic ink, relief printing ink, screen ink or offset overprinting ink. Additional components commonly used in inks may be present, such as solvents, pigments, dyes, additional resins, lubricants, solubilizers, surfactants, particulate matter, fluorescers, and other materials. Examples of dyes include organic dyes such as acridine dyes, anthraquinone dyes, arylmethane dyes, azo dyes, diazonium dies, nitro dyes, nitroso dyes, phthalocyanine dyes, quinone-imine dyes, thiazole dyes, xanthene dyes, and the like. In some embodiments, the dye is present in the ink in an amount ranging from 0.01 to 50 wt %, such as 30 wt % or less, or 10 wt % or less, or 5 wt % or less, or 1 wt % or less.

As used herein, the term "paint" refers to a liquid composition that forms a colored film when applied to a surface. Where the compositions described herein are used as a paint, the paint may contain (in addition to the components of the liquid curable compositions as described herein, e.g., a siccative, a binder, etc.) one or more of: pigments; dyes; solvents; surface tension modifiers; rheology modifiers; stabilizers; binders; antifreeze property modifiers; foaming controllers; skinning controllers; thickeners; emulsifiers; texture modifiers; adhesion promoters; antioxidants; UV stabilizers; flatteners (de-glossing agents); biocides; and other materials. In some embodiments, the paint is an oil-based paint and is a liquid curable composition that comprises: a siccative as disclosed herein; a pigment; and a curable resin as described herein. In some such embodiments, the paint further comprises a solvent. In some embodiments, the paint further comprises one or more additional components selected from those listed herein. In some embodiments, there is provided herein a method for painting a surface, the method comprising applying a paint (having a composition according to this disclosure) to a surface and allowing the paint to cure.

Examples of pigments that can be used in the paints of interest include metal compounds such as oxides (e.g., titanium dioxide, cobalt oxide, aluminum oxide, lead oxide, iron oxide, manganese oxide, mixtures thereof, etc.), chromates (e.g., barium chromate, strontium chromate, lead chromate, mixtures thereof, etc.), silicates (e.g., calcium copper silicate, aluminosilicates, mixtures thereof, etc.), sulfides and sulfates (e.g., cadmium sulfide, arsenic sulfide, lead sulfate, combinations thereof, etc.), nitrites (e.g., potassium cobaltinitrite, etc.), carbonates (e.g., calcium carbonate), metal complexes (e.g., copper acetate, iron hexacyanoferrate, copper carbonate, copper acetoarsenite, copper phthalocyanine, nickel azo yellow, etc.), as well as hydrates, partial hydrates, doped forms, and combinations thereof. Further examples include materials such as carbon black, chalk, whiting, barytes, silica, mica, kaolin, talk, marble dust, talc, and the like, Additional examples of pigments are known and can be used as described herein. The amount of pigment present in the paint will vary depending on the intended use and paint composition. In some embodiments the pigment will be present in an amount from 1 to 50 wt %, such as between 5 and 40, or between 5 and 30, or between 10 and 30 wt %. In some embodiments, the pigment is present in about 1 wt % or more, or about 5 wt % or more, or about 10 wt % or more, or about 20 wt % or more, or about 30 wt % or more, or about 40 wt % or more. In some embodiments, the pigment is present in about 30 wt % or less, or about 20 wt % or less, or about 10 wt % or less, or about 5 wt % or less, or about 1 wt % less. The amount of pigment may also be expressed relative to the amount of binder. For example, the pigment volume concentration (PVC) is equal to the volume of pigment alone divided by the total volume of pigment and binder together. Suitable PVC values may be in the range of 0.1-0.8, such as between 0.2-0.8, or between 0.3-0.8, or between 0.4-0.8, or between 0.1-0.4, or between 0.2-0.4.

Examples of antioxidants include, for example, phenolic antioxidants, and amine antioxidants, and antioxidants such as those sold by Mayzo, Inc. (Suwanee, Ga.), including phosphites (Benefos®) organic compounds (BNX® products, BLS® products,), and the like. In some embodiments, the compositions contain one or more antioxidants in an amount from 0.001 to 0.5 wt %, such as in an amount of about 0.001 or greater, or about 0.01 or greater, or about 0.1 or greater, or about 0.2 or greater, or about 0.3 or greater, or about 0.4 wt % or greater.

Optionally, the compositions may further contain a dispersant/emulsifier. Examples include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and surfactants manufactured by Rohm & Haas under the trademark OROTAN® (e.g., 1124, 1288, 731 DP and 850). These materials may also serve as stabilizers and surface tension modifiers, among other roles. Dispersants/emulsifiers may be present in any suitable amount, such as between 0.0001 and 10 wt %.

Optionally, the compositions may further contain a solvent. Suitable organic solvents, which dilute the air-drying resins such as alkyds, find use in the compositions of interest and may include, but are not limited to: aliphatic, cycloaliphatic and aromatic hydrocarbons, alcohol ethers and alcohol esters. Examples include white spirit, mineral turpentine, toluene, methyethylketone, methylisobutylketone, xylenes, butylacetate, 1-methoxy-2-proyl acetate, and the like. Inorganic, namely, aqueous carriers contain the resin in the form of an emulsion formed from a suitable emulsifier, and these are also suitable. Combinations of solvents are also suitable. Solvents may be present, for example, in an amount ranging from 5-50 wt %, or between 5-30 wt %, such as about 5 or greater, or about 10 or greater, or about 20 or greater, or about 30 wt % or greater.

In some embodiments, the compositions of interest further contain one or more active metal carboxylate compounds. For example, the active metal may be selected from alkali metals, alkaline-earth metals, transition metals, rare earth metals, and other active metals. For example, the active metal carboxylate may be selected from a carboxylate of Li, Na, K, Mg, Ca, Sr, Ba, Zr, Cu, V, Co, Mn, Fe, Zn, Cr, Ni, Ag, Hf, Ce, La, Pr, Nd, Pm, Al, Sn, Pb, and Bi. In some embodiments, when present, the active metal carboxylate will be present in the compositions of the invention in an amount from 0.001 to 5 wt %, such as in an amount of about 0.001 or greater, or about 0.01 or greater, or about 0.1 or greater, or about 1.0 or greater, or about 2 or greater, or about 3 or greater, or about 4 wt % or greater.

In some embodiments, the compositions further contain one or more additional nitrogen based ligands in an amount from 0.01 to 1 wt %. Such additional nitrogen based ligands may be aromatic or aliphatic and may be monodentate, bidentate, tridentate, tetradentate, pentadentate, or hexadentate.

In some embodiments, the compositions described herein further contain one or more radical-generating compounds such as peroxides and the like. Such radical-generating compounds aid the curing process by initiating polymerization of reactive unsaturated groups present in the compositions. The radical-generating compound may be present in an amount from 0.01 to 10 wt %, such as in an amount or 0.01 wt % or more, or 0.1 wt % or more, or 1.0 wt % or more, or 2 wt % or more, or 3 wt % or more, or 4 wt % or more, or 5 wt % wt % or more. Examples of radical-generating compounds include azobisisobutyronitrile (AIBN) and benzoyl peroxide (BPO).

Where the compositions described herein are used as a linoleum floor covering, the floor covering may further contain additional resins, mineral fillers, cork and wood products such as cork dust and wood flour, and other materials.

Preparation of the compositions of the invention may be carried out in any convenient and appropriate manner. For example, in some embodiments, the siccative is added during production of the resin. Alternatively, in some embodiments, the siccative is added to the resin after the resin has been prepared but before use of the composition as a liquid curable medium (e.g., as a resin, coating, ink, thermoset resin, linoleum floor covering, etc.). For example, in some embodiments, a siccative is added to a resin as described herein to provide a liquid curable medium, and the liquid curable medium is stored for a length of time (e.g., several minutes in air, or several hours, days, weeks, or months in a closed container), before being applied to a mold or to a surface as a coating. The siccative may also be added to the composition just prior to the use of the composition.

In some embodiments, the siccative may be partly or completely dissolved in the alkyd resin, emulsion, etc. In such embodiments, once the liquid curable medium is prepared it is used in the desired application as a single composition.

In some embodiments, the siccative and liquid curable component may be applied to a surface or mold as two separate solutions and allowed to mix or contact one another in situ. For example, a solution containing a siccative and a solution containing a resin can be applied sequentially (in either order) to a surface such that each applied solution forms a thin coating. When the two coatings are in contact, the siccative aids curing of the resin coating layer.

In some embodiments, there is provided herein a painted surface, wherein the paint is a composition according to this disclosure. Surfaces that can serve as a substrate for the compositions of interest (e.g., paints, inks, resins, etc.) may be flat, curved, smooth, rough, porous, non-porous, or any combination thereof. The substrate may be made of wood (e.g., floors, walls, carvings, etc.), synthetic polymers, metals (e.g., automobile body panels, boat hulls, etc.), fabric (e.g., canvas, denim, etc.), ceramic (e.g., pottery, fiberglass, etc.), composites (e.g., reinforced carbon fibers, etc.), and combinations thereof.

In addition to using the siccatives of interest in compositions suitable as paints, inks, floor coatings, varnishes, etc., in some embodiments, the siccatives described herein can be used as an oxidative catalyst. For example, the siccatives can be used in methods that employ an oxidative catalyst for curing, reforming, transforming, or otherwise altering one or more reactants. In some such embodiments, one or more of the siccatives described herein is/are the only oxidative catalyst(s) present and employed in the method. In other such embodiments, the siccatives described herein are used in conjunction with other oxidative catalysts. Thus, in some embodiments, a siccative of interest is used along with, optionally, an amount of an oxidative catalyst known in the art (referred to herein as a "traditional oxidative catalyst"). Examples of traditional oxidative catalysts include organic and inorganic cobalt salts. In some embodiments, the use of a siccative of interest allows for use of less of the traditional oxidative catalyst compared to when the traditional oxidative catalyst is used alone. For example, in some embodiments, the use of a siccative of interest allows for use of 90% less or 75% less, or 50% less, or 25% less of a traditional oxidative catalyst compared to when the traditional oxidative catalyst is used alone.

As mentioned, other applications are suitable for the siccatives described herein, including applications where the siccative acts as an oxidation catalyst. In some such embodiments, the siccatives may be used in the oxidation of organic compounds, for example to prepare organic acids. In some embodiments, then, there is provided a method for oxidizing an organic compound comprising combining the organic compound with a siccative compound as described herein. In some such embodiments, the product of the method is an organic acid. In some embodiments there is provided a composition comprising a siccative of interest and an organic compound suitable for oxidation. For example, a siccative of interest may be used (and may replace a catalyst such as cobalt acetate or the like) in the oxidation of aromatic compounds to aromatic acids, such as the oxidation of xylenes to form terephthalic acids, or the oxidation of toluene to form benzoic acid. The reaction may be done in solvent or without a solvent, as appropriate.

In some embodiments, the siccatives of interest are useful in the hydroformylation of alkenes. In some embodiments, then, there is provided a method for hydroformylating an alkene comprising combining the alkene with a siccative compound as described herein. In some such embodiments, the method involves carbon monoxide and hydrogen gas as reactants, and the product is an aldehyde. In some embodiments there is provided a composition or a reaction mixture comprising a siccative of interest, an alkene, carbon monoxide, and hydrogen. For example, a siccative of interest may be used in a reaction converting propylene to butyraldehyde. In some such embodiments, a siccative of interest is used in place of tetracarbonylhydrocobalt or a similar catalyst.

In some embodiments, the siccatives of interest are useful in the oxidation of organic compounds such as the oxidation of cyclohexane to cyclohexanone. In some embodiments, then, there is provided a method for oxidizing an organic compound such as an alkane comprising combining the organic compound with a siccative compound as described herein. In some such embodiments, the method involves oxygen as an oxidant, and the siccative of interest replaces an oxidative catalyst such as a cobalt catalyst. In some embodiments there is provided a composition comprising a siccative of interest and an alkane suitable for oxidation to a ketone.

In some embodiments, the siccatives of interest are useful as polymerization catalysts. In some embodiments, then, there is provided a method for polymerizing an alkene comprising combining the alkene with a siccative compound as described herein. In some embodiments there is provided a composition comprising a siccative of interest and an alkene monomer. For example, in some embodiments, the siccatives of interest are useful in the polymerization of polybutadiene and polyisoprene rubbers.

In some embodiments, the siccatives of interest are useful in conjugative addition reactions, both for polymerization reactions and synthetic transformation reactions. Thus, there is provided herein a method for carrying out a conjugative addition reaction on a compound (e.g., on an unsaturated carbonyl-containing compound) that comprises combining the compound with a nucleophile and a siccative of interest. In some embodiments there is provided a composition comprising a siccative of interest, a nucleophile, and an unsaturated carbonyl-containing compound.

In some embodiments, the siccatives of interest are useful in the catalytic activation of bleaching components in washing powders. Thus, there is provided herein a method for bleaching a substrate, the method comprising combining a siccative of interest with a bleaching precursor (e.g., a peroxyacid bleach precursors, hydrogen peroxide liberating compounds, peroxyacids, etc.) and the substrate. In some such embodiments the method is carried out in water. In some embodiments there is provided a composition comprising a siccative of interest, a substrate to be bleached, and a bleaching precursor.

In some embodiments, the siccatives of interest are useful in the production of hydrogen via steam reforming of carbon monoxide. Thus, there is provided herein a method for the production of hydrogen comprising combining carbon monoxide with water and a siccative of interest under conditions suitable for steam reformation and production of hydrogen gas. In some embodiments there is provided a composition or reaction mixture comprising a siccative of interest, carbon monoxide, and water.

In some embodiments, the siccatives of interest are useful in the hydrogenation of carbon monoxide to produce liquid fuels. In some embodiments this reaction is known as the Fischer-Tropsch process. Thus, there is provided herein a method for the production of hydrocarbons (e.g., hydrocarbons suitable for fuels) comprising combining carbon monoxide with hydrogen gas and a siccative of interest under conditions suitable for hydrogenation and production of hydrocarbons. In some embodiments there is provided a composition or reaction mixture comprising a siccative of interest, carbon monoxide, and hydrogen gas.

In some embodiments, the siccatives of interest are useful in replacing traditional oxidative catalysts, such as in particular traditional cobalt catalysts, in the reactions that use such catalysts.

Other applications of the materials and methods of the invention will be apparent to the skilled artisan based on the disclosure provided herein.

In the embodiments described above, one or more advantages are provided by using the siccatives of interest in lieu of a traditional oxidative catalyst. For example, in some embodiments the siccatives of interest are used in less quantity compared with procedures that use traditional oxidative catalysts. In some embodiments, given a method that traditionally uses a certain quantity of a traditional oxidative catalyst, a similar method may use up to 20% less, or up to 30% less, or 40% less, or 50% less, or 60% less, or 70% less, or 80% less, or greater than 80% less (comparing weight to weight) of a siccative catalyst described herein.

In some embodiments, an advantage of using the siccatives described herein is that such materials are less carcinogenic and/or toxic (to animals, plants, the environment, etc.) compared with traditional oxidative catalysts. In some embodiments, the reduced toxicity and/or carcinogenicity derives from the inherent toxicity of the siccative compared with traditional oxidative catalysts. In some embodiments, the reduced toxicity and/or carcinogenicity derives from the lower amount of material that is needed when using a siccative described herein compared with a traditional catalyst. In some embodiments, both of these factors are important to reduce toxicity/carcinogenicity.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description as well as the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

EXAMPLES

In the examples that follow, efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Materials. Cobalt (II) 2-ethylhexanoate at known metal concentration of 10% was used as a reference. 5,10,15,20-tetrakisphenylporphyrin and 5,10,15,20-tetrakis(4'-methoxyphenyl)porphyrin were bought from chemical suppliers. The cobalt, iron and manganese metalloporphyrins were made by adapting known literature methods, and the compounds were dissolved in hydrocarbon solvents suitable for use in coatings, inks and thermoset resins.

Example 1

Preparation of Siccatives

Preparation of Manganese Carboxylate.

Manganese carboxylate was made by reaction, for several hours, of a suitable inorganic manganese salt with a slight excess of carboxylic acids under a nitrogen atmosphere in a hydrocarbon solvent. When reaction was complete (3 to 24 hours), evidenced by no presence of the manganese salt, the by-product was removed. The dried product was diluted to a metal concentration of 10%.

In a specific example, Manganese (II) oxide (65.5 g), 2-ethylhexanoic acid (288.2 g), 80% acetic acid (13.9 g), and a Hydrocarbon solvent (147 g) were used according to the procedure.

In another example, MnO (154.9 lbs), 2-ethylhexanoic acid (582.7 lbs), mineral spirits (174.6 lbs), 90% formic acid (2.6 lbs), water (11.1 lbs), and amyl acid phosphate (124.0 lbs) were used according to a similar procedure. The reactants were charged to a reactor and heated to 220-230° F. for 2 hours. Water was removed by heating to 300-325° F. for 3 hours. Reaction was cooled to about 150-160° F. and adjusted to a metal concentration of 12%. Product was filtered for purity.

Preparation of a Porphyrin-Metal Conjugate.

A porphyrin (5,10,15,20-tetrakisphenylporphyrin, 1.118%) was mixed in a combination of hydrocarbon and hydroxylated solvents. To this mix was added the manganese carboxylate (1%). The mix was reacted at 284-356° F. (140-180° C.) for between 0.25 and 24 hours. The reaction was monitored by thin layer chromatography (using dichloromethane as eluant) and/or UV/Visible chromatography. TLC monitors the loss of the free base porphyrin and the formation of the metallated porphyrin. UV/Visible chromatography monitors the shift of the Soret bands and collapse of the Q bands.

Different solvents can be used to solubilize the metal carboxylate and free base porphyrin. For the above procedure, hydrocarbon and hydroxylated solvents were used because of the application area for the final product. Furthermore, this method of metallation may be used for different metal slats and free base porphyrins. Changes in the molar ratios of the metal salt and free base porphyrin affect the process time and final product yield.

Example 2

Drying Times of Coatings

Coating mixtures were prepared using materials prepared according to the procedures in Example 1. Addition rates, cobalt 2-ethylhexanoate 10% metal solution or Mn-5,10,15, 20-tetrakisphenylporphyrin (MPP) 0.1% metal solution, are between 0.05% and 0.8% w/w. Formulations were prepared using white paints, solvent and water based, alkyds, alkyd emulsions, and polyurethane modified materials. The metal carboxylates were added to the test compositions under agitation and mixed thoroughly for a minimum of 15 minutes.

Drying Test.

The test coatings were applied to glass slides using applicator cubes to give a wet film of thickness applicable to the application area of the test coating. For the purposes of these tests the wet film thickness range was from 37 to 200 micron, with the majority at 100 or 150 micron. The different stages of drying were determined using Beck Koller drying recorders over a set time period under controlled conditions of constant temperature and humidity.

Color Test.

To measure the change in the film color the test substrates were applied to prepared color cards (at the same wet film thickness as was used for the drying test). The films were allowed to dry overnight in the dark. Using a color meter the La*b* values were recorded. The dried films were left in the dark under controlled conditions of constant temperature and humidity for a minimum of 4 weeks. After this time the La*b* values were re-measured and the change from the initial values calculated.

The above procedure was repeated a number of times. In each repetition drying times were measured for the coatings containing MPP and the coatings containing Co reference. Table 1 below provides comparison of drying time (hrs) data. The data were obtained representing the drying process as four distinct phases (BK1, BK2, BK3, and BK4). Calcium and Zirconium carboxylates were present in the mixtures as co-driers. Additionally, La*b* measured color of the paint film are shown before and after ageing.

TABLE 1

Drying time and color comparisons for colored coatings

| Example | | Drying Time (hr) | | | | L | a* | b* |
|---|---|---|---|---|---|---|---|---|
| | | BK1 | BK2 | BK3 | BK4 | Before/After | Before/After | Before/After |
| 1 | Co | 0.6 | 2.0 | 3.1 | 7.1 | 95.56/94.32 | −1.01/−0.61 | 5.26/9.82 |
| | MPP | 0.9 | 2.3 | 2.75 | 3.55 | 96.56/96.65 | −0.59/−0.79 | 4.60/5.31 |
| 2 | Co | 1.6 | 2.5 | 4 | 5.4 | 95.56/94.32 | −1.01/−0.61 | 5.26/9.82 |
| | MPP | 1.6 | 2.8 | 3 | 4.3 | 95.75/96.31 | −0.71/−0.93 | 3.10/4.30 |
| 3 | Co | 0.9 | 2.4 | 4.9 | 13.1 | 94.93/94.00 | −1.11/−0.89 | 3.51/7.60 |
| | MPP | 1.2 | 2.7 | 3.6 | 9.2 | 94.73/94.51 | −1.17/−1.24 | 1.31/2.67 |
| 4 | Co | 1.0 | 2.7 | 6.4 | 19.5 | 93.83/91.71 | −1.75/−0.19 | 5.58/11.15 |
| | MPP | 1 | 1.8 | 2 | 4.7 | 94.75/94.64 | −1.10/−0.34 | 4.43/5.15 |
| 5 | Co | 1.4 | 4.3 | 12.3 | 17.9 | 97.29/95.96 | −1.28/−0.81 | 4.62/8.94 |
| | MPP | 1.7 | 5.3 | 6.6 | 9.7 | 97.13/97.16 | −0.67/−1.3 | 3.47/4.79 |
| 6 | Co | 1.4 | 4.5 | 13.8 | 24.1 | 97.11/95.77 | −1.31/−0.62 | 4.76/9.18 |
| | MPP | 1.4 | 5.4 | 6.4 | 12.0 | 97.03/97.03 | −0.50/−1.26 | 2.82/4.32 |
| 7 | Co | 0.5 | 2.4 | 2.9 | 4.8 | 96.66/95.4 | −0.75/−0.68 | 3.5/9.35 |
| | MPP | 0.5 | 2.6 | 3.2 | 5.3 | 95.37/95.49 | −0.69/−0.34 | 0.04/1.47 |
| 8 | Co | 0.6 | 4.8 | 5.5 | 8.5 | 97.4/96.76 | −0.88/−1.21 | 3.21/7.33 |
| | MPP | 0.8 | 9 | 11.7 | 15 | 96.61/96.79 | −0.74/−0.26 | 2.5/3.47 |
| 9 | Co | 0.6 | 4.6 | 5.4 | 6.5 | 97.15/96.57 | −0.83/−1.12 | 3.1/6.91 |
| | MPP | 0.6 | 6.5 | 8.9 | 12. | 96.05/95.96 | −0.79/−0.94 | 0.13/1.28 |
| 10 | Co | 1.25 | 2.0 | 3.5 | 6.25 | 96.41/93.10 | −0.83/−0.07 | 4.64/14.55 |
| | MPP | 2.1 | 3.3 | 4.3 | 6.3 | 96.46/96.58 | −0.73/−1.18 | −3.31/4.55 |

TABLE 2

Drying time comparisons for clear coatings

| Sample | | Drying Time (hr) | | | |
|---|---|---|---|---|---|
| | | BK1 | BK2 | BK3 | BK4 |
| 11 | Co | 1.9 | 3.1 | 3.8 | 4.9 |
| | MPP | 4.0 | 6.7 | 7.8 | 9.8 |
| 12 | Co | 0.8 | 3.5 | 4.5 | 8 |
| | MPP | 1.3 | 4.5 | 5.7 | 6.3 |
| 13 | Co | 0.8 | 3.2 | 3.7 | 6.2 |
| | MPP | 1.5 | 4 | 4.9 | 8 |

Example 3

Gel and Curing Times of Unsaturated Polyester Resins

Unsaturated polyester resins of different reactivity (determined by the ratio of maleic/fumaric acid to phthalic/isophthalic acid) were prepared in styrene. These resins were utilized for the evaluation of the different metal carboxylates.

Addition rates, cobalt 2-ethylhexanoate 10% metal solution or Mn-5,10,15,20-tetrakisphenylporphyrin (MPP) 0.1% metal solution, were between 0.05% and 0.5% w/w. The metal carboxylates were added to the test compositions under agitation and mixed thoroughly for a minimum of 15 minutes. Samples were prepared using clear, pigmented, low styrene emission gelcoats, laminating resins and casting resins, with Potassium and Copper carboxylates as the co-accelerators.

The gel times were determined using Techne gel timers (plunge technique) using a minimum of 50 ml of test resin. The cure time and heat exotherm were measured using a thermocouple. The thermocouple was inserted into the gelled test resin immediately after the resin had gelled. The cure time was the elapsed time from the point of gelation to the point of highest exotherm. The peak exotherm was the highest temperature reached during the curing process.

The laminate hardness development was determined with a 2-plyglass fiber (450 g/m$^2$) reinforced unsaturated polyester resin composition. The resin to glass fiber ratio was between 2 and 4:1. A small quantity of the initiated resin was applied to the backing plastic, to this was added the first layer of glass fiber and rolled through to thoroughly wet out the glass fiber mat. The remaining resin was poured onto the first mat and the second layer applied on top and as previously rolled out to thoroughly wet out the glass fiber matting. The laminate was allowed to gel and cure, the hardness development was tested at regular intervals using Shore-D and Barcol 934.1 impellors.

The cast hardness development was determined on the resin alone, no reinforcement used. The initiated resin was poured into a metal ring and allowed to gel and cure, the hardness development was tested at regular intervals using Shore-D and Barcol 934.1 impellors.

In the evaluation of the different unsaturated polyester resin systems the addition rates of the potassium and copper carboxylates were set according to the required cure and exotherms for the resins under test. For each individual system the same addition rates were used for the copper and potassium when comparing the performance of the Mn-5,10,15,20-tetrakisphenylporphyrin to that of the cobalt standard.

Data are provided in the following tables.

TABLE 3

Gel time comparisons for UP resins

| Geltime | Gelcoat | Laminate 1 | Laminate 2 | Cast |
|---|---|---|---|---|
| Co | 4.4 | 16.3 | 27.8 | 12.4 |
| MPP | 4.5 | 15.8 | 28.0 | 9.7 |

TABLE 4

Cure time for Laminate 1

| | Temperature (° C.) | |
|---|---|---|
| Time (mins after gelation) | Co | MPP |
| 1 | 26.1 | 26 |
| 2 | 28.2 | 29 |
| 3 | 36.6 | 39.1 |
| 4 | 46.1 | 51.2 |
| 5 | 54.2 | 59.8 |
| 6 | 70.1 | 79.3 |
| 7 | 105.5 | 116.6 |
| 8 | 132.5 | 140.7 |
| 9 | 159.6 | 165.5 |
| 10 | 175.7 | 181.1 |
| 11 | 179.9 | 184.3 |
| 12 | 182.7 | 185.4 |
| 13 | 183.3 | 185.4 |
| 14 | 183.4 | 184.9 |
| 15 | 181.6 | 180.2 |

TABLE 5

Laminate 1 Hardness Development[1]

| | Shore D | | Barcol 934.1 | |
|---|---|---|---|---|
| Time (mins) | Co | MPP | Co | MPP |
| 30 | 19 | 21 | — | — |
| 60 | 23 | 26 | — | — |
| 90 | 31 | 33 | — | — |
| 120 | 40 | 45 | — | — |
| 150 | 60 | 62 | — | — |
| 180 | 71 | 72 | — | — |
| 210 | 76 | 76 | — | — |
| 240 | 79 | 78 | 8 | 10 |
| 270 | — | — | 14 | 17 |
| 300 | — | — | 24 | 24 |
| 330 | — | — | 31 | 33 |
| 360 | — | — | 39 | 40 |
| 390 | — | — | 39 | 40 |

[1]2-ply 450 g/m$^2$ glass fibre, 2.5:1 resin to glass

In Table 3, it can be seen that the resin using MPP had comparable or faster gel times compared with the resin using Co.

In Table 4, it can be seen that, in this particular experiment, the temperature of the resin using MPP immediately after gelation is roughly the same as the temperature of the resin using Co, but that such temperature increases more rapidly for MPP.

In Table 5, it can be seen that hardness development in a laminate using MMP is roughly equivalent (or better) compared with hardness development in a laminate using Co.

What is claimed is:

1. A curable composition comprising:
a resin that cures by an oxidative process,
wherein
the resin is present in the composition in an amount from 1 to 90% w/w; and
the resin is selected from the group consisting of an alkyd-based resin and
a resin that comprises
a polyester or a polyurethane; and
a crosslinkable media; and
a siccative present in the composition in an amount from 0.0001 to 1% w/w, wherein the siccative comprises a transition metal complexed with a porphyrin ligand, wherein the transition metal is Mn, and wherein the porphyrin ligand has the structure of formula (I)

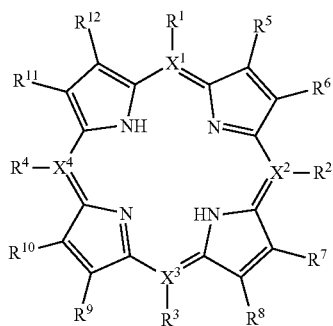

wherein:
$X^1$, $X^2$, $X^3$, and $X^4$ are
$R^1$-$R^4$ are independently selected from $C_5$-$C_{20}$ aryl and $C_5$-$C_{20}$ aryloxy; and
$R^5$-$R^{12}$ are each hydrogen.

2. The composition of claim 1, wherein the resin is an alkyd-based resin comprising an unsaturated polyester prepared from a polyol, a polycarboxylic acid, and an unsaturated fatty acid.

3. The composition of claim 1, wherein the resin comprises a polyurethane and a crosslinkable media.

4. The composition of claim 1, wherein the resin is an alkyd based resin.

5. The composition of claim 1, wherein the resin comprises a polyester and a crosslinkable media.

6. The composition of claim 5, wherein the crosslinkable media comprises a vinyl monomer.

7. A composition comprising:
a precursor mixture of a resin, wherein the resin cures by an oxidative process,
wherein
the resin is an alkyd-based resin; and/or
the resin comprises:
a polyester or polyurethane; and
a crosslinkable media; and
a metal-porphyrin complex, wherein the metal-porphyrin complex comprises a transition metal selected from Co, Mn and V, and wherein the metal-porphyrin complex comprises a porphyrin ligand that has the structure of formula (I)

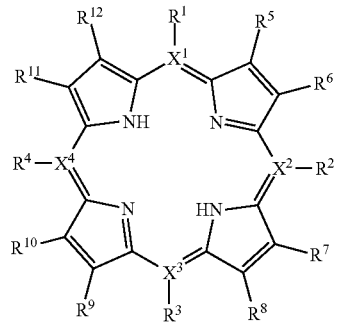

wherein:
$X^1$, $X^2$, $X^3$, and $X^4$ are C;
$R^1$-$R^4$ are independently selected from $C_5$-$C_{20}$ aryl and $C_5$-$C_{20}$ aryloxy; and
$R^5$-$R^{12}$ are each hydrogen.

8. The composition of claim 7, wherein the resin is an alkyd-based resin.

9. The composition according to claim 8, wherein the alkyd-based resin comprises an unsaturated polyester prepared from a polyol, a polycarboxylic acid, and an unsaturated fatty acid.

10. The composition of claim 7, wherein the resin comprises a polyester and a crosslinkable media.

11. A curable composition comprising:
a resin that cures by an oxidative process and is present in the composition in an amount from 1 to 90% w/w; and
a siccative present in the composition in an amount from 0.0001 to 1% w/w, wherein the siccative comprises a metal-porphyrin complex comprising manganese complexed with a porphyrin ligand, and wherein the siccative is produced by a method comprising:
i) combining:
a porphyrin ligand; and
a manganese salt; to produce a mixture; and
ii) heating the mixture to produce the siccative comprising the metal-porphyrin complex,
wherein the porphyrin ligand has the structure of formula (I)

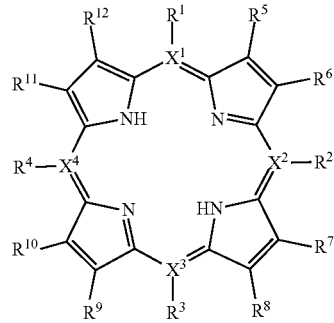

wherein:
$X^1$, $X^2$, $X^3$, and $X^4$ are C;
$R^1$-$R^4$ are independently selected from $C_5$-$C_{20}$ aryl and $C_5$-$C_{20}$ aryloxy; and
$R^5$-$R^{12}$ are each hydrogen.

12. The composition of claim 11, wherein the heating step comprises heating the mixture to a temperature in the range of 140 to 180° C. for a time period in the range of 0.25 to 24 hours.

13. The composition of claim 11, wherein
the resin is an alkyd-based resin; and/or
the resin comprises:
   a polyester or polyurethane; and
   a crosslinkable media.

14. The composition of claim 11, wherein the manganese salt is a manganese carboxylate.

15. The composition of claim 13, wherein the resin is an alkyd-based resin.

16. The composition according to claim 15, wherein the alkyd-based resin comprises an unsaturated polyester prepared from a polyol, a polycarboxylic acid, and an unsaturated fatty acid.

17. The composition of claim 13, wherein the resin comprises a polyester and a crosslinkable media.

18. A curable composition comprising:
   a resin selected from the group consisting of an alkyd-based resin and a resin that comprises a polyurethane and a crosslinkable media; and
   a siccative, wherein the siccative comprises a transition metal complexed with a porphyrin ligand, wherein the transition metal is selected from Co, Mn and V, and wherein the porphyrin ligand is 5,10,15,20-tetrakisphenylporphyrin or 5,10,15,20-tetrakis(4)-methoxyphenyl)porphyrin.

19. The composition of claim 18, wherein the resin is an alkyd-based resin.

20. The composition according to claim 19, wherein the alkyd-based resin comprises an unsaturated polyester prepared from a polyol, a polycarboxylic acid, and an unsaturated fatty acid.

\* \* \* \* \*